United States Patent [19]

Michie

[11] Patent Number: 5,392,048

[45] Date of Patent: Feb. 21, 1995

[54] WEATHER RADAR SYSTEM INCLUDING AN AUTOMATIC STEP SCAN MODE

[75] Inventor: Terry K. Michie, Olathe

[73] Assignee: AlliedSignal Inc., Morris Township, Morris County, N.J.

[21] Appl. No.: 89,469

[22] Filed: Jul. 12, 1993

[51] Int. Cl.6 ............................................. G01S 13/95
[52] U.S. Cl. .................................... 342/26; 342/75; 342/78; 342/158
[58] Field of Search ...................... 342/26, 75, 78, 158

[56] References Cited

U.S. PATENT DOCUMENTS

| | | | |
|---|---|---|---|
| 4,940,987 | 7/1990 | Frederick | 342/26 |
| 5,059,967 | 10/1991 | Roos | 342/26 |
| 5,077,558 | 12/1991 | Kuntman | 342/26 |
| 5,175,551 | 12/1992 | Rubin | 342/26 |
| 5,198,819 | 3/1993 | Susnjara | 342/26 |
| 5,202,690 | 4/1993 | Frederick | 342/26 |
| 5,311,184 | 5/1994 | Kuntman | 342/26 |
| 5,315,297 | 5/1994 | Comman | 342/26 X |
| 5,337,057 | 8/1994 | Michie | 342/176 |
| 5,351,045 | 9/1994 | Comman | 342/26 X |

Primary Examiner—John B. Sotomayor
Attorney, Agent, or Firm—Howard G. Massung

[57] ABSTRACT

A weather radar system is operable in an automatic mode for positioning the radar system antenna beam to scan an elevation axis between upper and lower scan limits in incremental steps as selected by a user while continuously scanning an azimuth axis for enhancing the analysis of weather conditions.

7 Claims, 4 Drawing Sheets

WEATHER RADAR SYSTEM INCLUDING AN AUTOMATIC STEP SCAN MODE

BACKGROUND OF THE INVENTION

This invention relates generally to a weather radar system having the capability of analyzing weather conditions. More particularly, this invention relates to a weather radar system configured for positioning the radar system antenna beam for the purposes described. Still more particularly, this invention relates to a weather radar system of the type described which features an automatic mode for enhancing weather condition analysis and reducing user workload.

Weather radar systems have different requirements depending upon the mission and/or end use of the system. For example, weather radar systems for marine or small aircraft applications are typically directed to detection and avoidance of threatening weather conditions. Systems for land based and medium to large aircraft applications are directed to both detection and analysis of weather conditions. In this regard, it is noted that the purpose of weather condition analysis is to provide weather warnings, as in land based radar applications, and to facilitate decisions to fly through or around weather disturbances, as in airborne radar applications.

To assess the threat of a weather condition, both reflectivity information, which relates to the rate of precipitation due to the weather condition, and information as to the height of the weather condition need to be taken into account. The user of conventional radar systems requires substantial training and experience to be able to accurately analyze a potential weather threat from this information. In the case of airborne radar, user workload is an important consideration as will be appreciated. This consideration is magnified when approaching and landing an aircraft under adverse weather conditions.

In regard to conventional weather radar systems, a user is provided with a single elevation (vertical) plan view on a display. That is to say, a view looking down, with the radar antenna scanning through an azimuth angle (horizontally) at a particular elevation angle. The elevation angle is manually controlled by the user and which control is usually referred to as "tilt control." The user must continually adjust the elevational or tilt of the display to obtain an impression of the height of the various weather conditions and their physical relationship to the user's position. The disadvantages of weather radar systems of the type described are as follows: (1) the single elevation plan view is the only information available at any give time; (2) user skill is required to effectively adjust the tilt of the display to perceive weather condition height information; and (3) continual tilt adjustment disadvantageously adds to the user's workload.

An improvement in the weather radar system art to avoid the aforenoted disadvantages features using the radar antenna in a vertical scanning (elevation)mode. This mode provides a vertical side view on the display at a given radial angle. Height versus range information is thus readily available to the user. The disadvantage to this approach is that the data is only applicable to a selected azimuth angle. Thus, the user is again required to exercise skill and constant attention to assess a weather condition at all azimuth angles.

A further improvement in the weather radar art is advanced in U.S. Pat. No. 4,940,987 (U.S. Class 342/26) issued to Frederick on Jul. 10, 1990. This approach features displaying two simultaneous views of a weather condition, i.e. a conventional plan view and a vertical side or frontal view. The net effect of this approach is to view a weather condition in two intersecting planes. One plane is a horizontal plan view, while the other plane is user selected as a vertical slice along the radar range axis, or a vertical slice perpendicular to said range axis. The vertical slices or views can be adjusted as to their thickness such that, for example, the frontal view represents an integration of the information from one range to another. The disadvantages of this approach are as follows: (1) the user update rate is slow because the antenna beam must be positioned to cover a full volume of space; (2) user interpretation is difficult because the data is included in two intersecting planes as aforenoted; (3) the user workload is high because of the required range or radial angle selection for the vertical slices or views; and (4) the radar system requires substantial hardware (memory) to support this approach.

Still another approach to the noted problem is advanced in U.S. Pat. No. 5,198,819 (U.S. Class 342/26) issued to Susnjara on Mar. 30, 1993. This approach stores multiple plan views in their own display memories. The views are then shown in overlapping fashion on the display, with only the highest of the stored views shown in true weather condition precipitation intensities. The concept of storage of multiple plan views suffers from a long lag time to fill all memory planes. Each horizontal scan usually takes several seconds to complete. Even if the currently scanned view is continuously updated, the displayed complete view has data that could be almost a minute old. This problem is especially evident when aircraft heading changes are made. Further, the overlapping views can lead to dangerous flight conditions for airborne weather systems, in that low altitude features can be overlooked. Also this concept is costly in that a memory plane is needed for all plan views. Finally, a display unit as required is complex and not readily available in current weather radar systems.

Accordingly, it is an object of this invention to provide an automatic mode of operation for positioning a radar antenna beam in the elevation axis while scanning the horizontal axis to avoid the disadvantages of the prior art.

It is another object of this invention to permit a user to select elevation axis scan limits and elevation axis scan increments to achieve the purposes of the invention.

It is still another object of this invention to provide an automatic mode of operation for the radar system which is user selectable such that activation is on demand as required, with conventional scanning being readily available.

It is yet another object of this invention to provide a weather radar system display that is easy to understand so as to minimize interpretation time.

It is a further object of this invention to minimize radar system hardware and to provide an approach which can be readily adapted to a conventional weather radar system.

SUMMARY OF THE INVENTION

This invention contemplates a weather radar system including an automatic step scan mode, i.e. an automatically incrementing elevation axis mode for weather analyses, which is activated by adjusting radar system display tilt beyond a selected one of either upper and lower tilt limits. The radar system adjusts the tilt to the selected one limit, scans horizontally, increments the tilt by a specific amount, scans horizontally in the opposite direction, increments the tilt again, and continues this sequence until the other tilt limit is reached. At this point the tilt is decremented in steps on alternate horizontal scans. This process continues until the user elects to scan at a particular tilt angle, which is simply selected by a tilt control arrangement. The tilt upper and lower limits and increment angle are user selected and stored in a module separate from the radar system. This arrangement has the advantage of maintaining information even if the radar system is replaced for routine maintenance or the like. While the step scan mode is activated, the user is automatically updated with sequential plan views at incremental slices of the weather condition. The individual plan views are identified by a tilt angle value annunciated on a display. As the user observes these slices a clear picture of the height profile of the weather condition at all radial angles is obtained. The information available is the most recent, rather than that stored for several scans of the radar system. The information is always presented as a horizontal plan view, so that the user is comfortable with interpretation. Finally, the step scan mode requires only minimal additional hardware so that it can be adapted to most conventional radar systems.

Apparatus according to the invention features means for storing weather data in memory, means connected to the means for storing the weather data in memory for displaying said weather data, means associated with the means for displaying the weather data and operable by a user for selecting the step scan mode, control means connected to an antenna included in the weather radar system for displacing said antenna, means for storing radar system parameters, the control means connected to the means associated with the means for displaying the weather data and to the means for storing radar system parameters, and responsive to the selected step scan mode for setting step scan parameters in the means for storing radar system parameters, said radar system parameter storing means applying the set step scan mode parameters to the control means, and the control means displacing the radar system antenna in accordance with the applied step scan mode parameters.

A method according to the invention includes storing weather data in memory, displaying the weather data stored in memory, selecting the step scan mode in accordance with the displayed weather data, storing step scan mode parameters, setting the stored step scan mode parameters, and displacing the weather radar system antenna in accordance with the set step scan mode parameters for positioning the antenna beam.

DETAILED DESCRIPTION OF THE INVENTION

Figure 1:
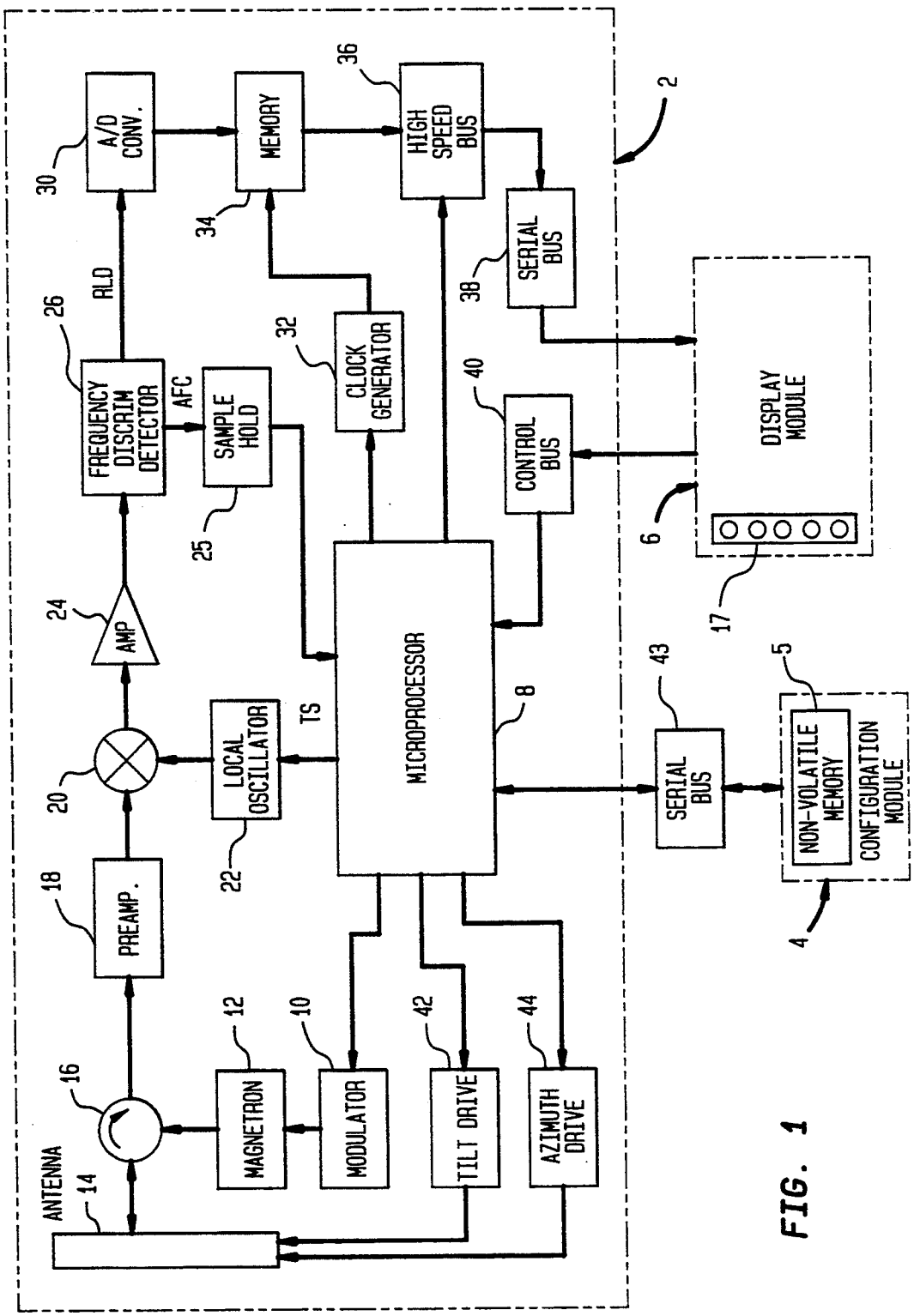
FIG. 1 is a block diagram of a weather radar system according to the invention.

With reference to FIG. 1, the weather radar system of the invention includes an antenna/receiver/transmitter (ART) module 2, a configuration module 4, and a display module 6. ART module 2 features a central microprocessor 8. Microprocessor 8 controls various radar system functions such as control, input/output, receiver, transmitter, and antenna steering, as will hereinafter become evident.

With reference to ART module 2, a modulator 10 is triggered by a pulse from microprocessor 8 and provides a drive signal for a high power microwave oscillator such as a magnetron 12. The output from magnetron 12 is applied to an antenna 14 via a circulator device 16 which directs a microwave pulse out of the antenna. The microwave pulse travels through space and is reflected off of the precipitation in a weather disturbance. The reflected pulse returns to antenna 14, and is directed through circulator 16 into a preamplifier 18. Preamplifier 18 is of the type having a good sensitivity so as to pick out small reflections relative to existing noise levels.

The frequency of the output from preamplifier 18 is mixed by a mixer 20 with the frequency of the output from a local oscillator 22. Mixer 20 provides an intermediate frequency (IF) output which is applied to an amplifier 24. Amplifier 24 raises the level of the signal from mixer 20 such that a frequency discriminator/detector 26 provides signals for both automatic frequency control (AFC) and reflectivity level detection (RLD). Signal AFC is sampled and held by a sample and hold device 28 and the sampled and held signal is applied therefrom to microprocessor 8 which responds thereto to provide a tuning signal (TS) for adjusting the frequency of local oscillator 32 so that the output of mixer 20 is always at a predetermined frequency such as, for example, sixty mhz.

Signal RLD from frequency discriminator/detector 26, which is an analog signal, is converted to a weather data digital signal by an analog to digital (A/D) converter 30. Depending on a particular range selected via microprocessor 8, a clock signal from a clock generator 32 controlled by microprocessor 8 triggers a memory device 34 to store the weather data signal. A high speed bus 36 formats the weather data from memory device 34 into a serial bus 38, which applies the weather data to display module 6.

A control bus 40 leading from display module 6 is decoded and controls the operational mode of microprocessor 8. Microprocessor 8 applies commands to tilt and azimuth drive devices 42 and 44, respectively, which in turn move antenna 14 in various modes. The auto step scan mode of the invention is one of several antenna positioning modes available to the user of the radar system.

Microprocessor 8 stores data in and retrieves data from configuration module 4 at various times via a serial bus 43. The stored data is used to set particular parameters of the radar system to customize the use of the system as required.

Automatic scan upper and lower angle limit data and step increment data are the particular data stored in configuration module 4 for purposes of the invention.

The data is stored in non-volatile memory 5 included in module 4 such that it is retained without power being applied, as will be understood by those skilled in the art. The user has the ability to select this data by use of controls such as 17 on display unit 16. For purposes of illustration, an upper scan limit is 0 to +15 degrees and a lower scan limit is 0 to −15 degrees. A step increment is one to 7 degrees.

Display unit 6 is of a conventional design well known in the radar system art. Weather conditions are displayed in colors to depict the reflectivity level of the reflected signal. Control 17 likewise common in the art is located on the face of the display unit. Tilt control is the specific control used to activate and deactivate the automatic step scan mode contemplated by the invention.

Figure 2:
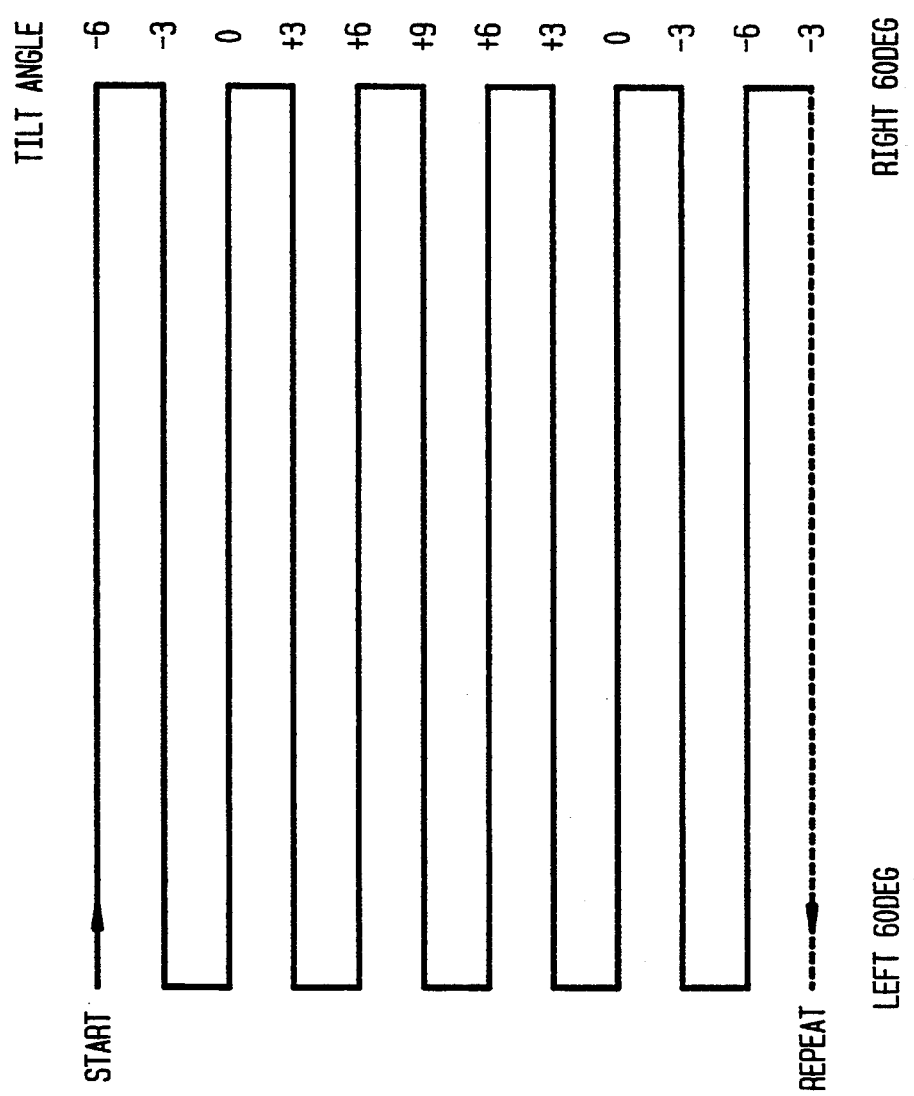
FIG. 2 is a diagrammatic representation of an antenna tilt sequential scan pattern.

With reference to FIG. 2, after the tilt control is adjusted via control 17 to greater than ±15 degrees, the automatic step scan mode is initiated. The tilt angle is driven to the configured lower limit (−6 degrees in FIG. 2), then scans horizontally over the full azimuth angle (120 degrees in FIG. 2). Thereafter, the tilt control is incremented by the configured step size (3 degrees in FIG. 2) and then scans horizontally in the opposite direction. This mode continues until the tilt angle reaches the configured upper limit (+9 degrees in FIG. 2). This process continues with the tilt decrementing back to the starting point. It should be noted that the step scan mode could be implemented to step from the upper limit down to the lower limit and then reset to the lower limit if desired. To deactivate this mode, the tilt control on control 17 is simply adjusted to the desired constant tilt angle.

Figure 3:
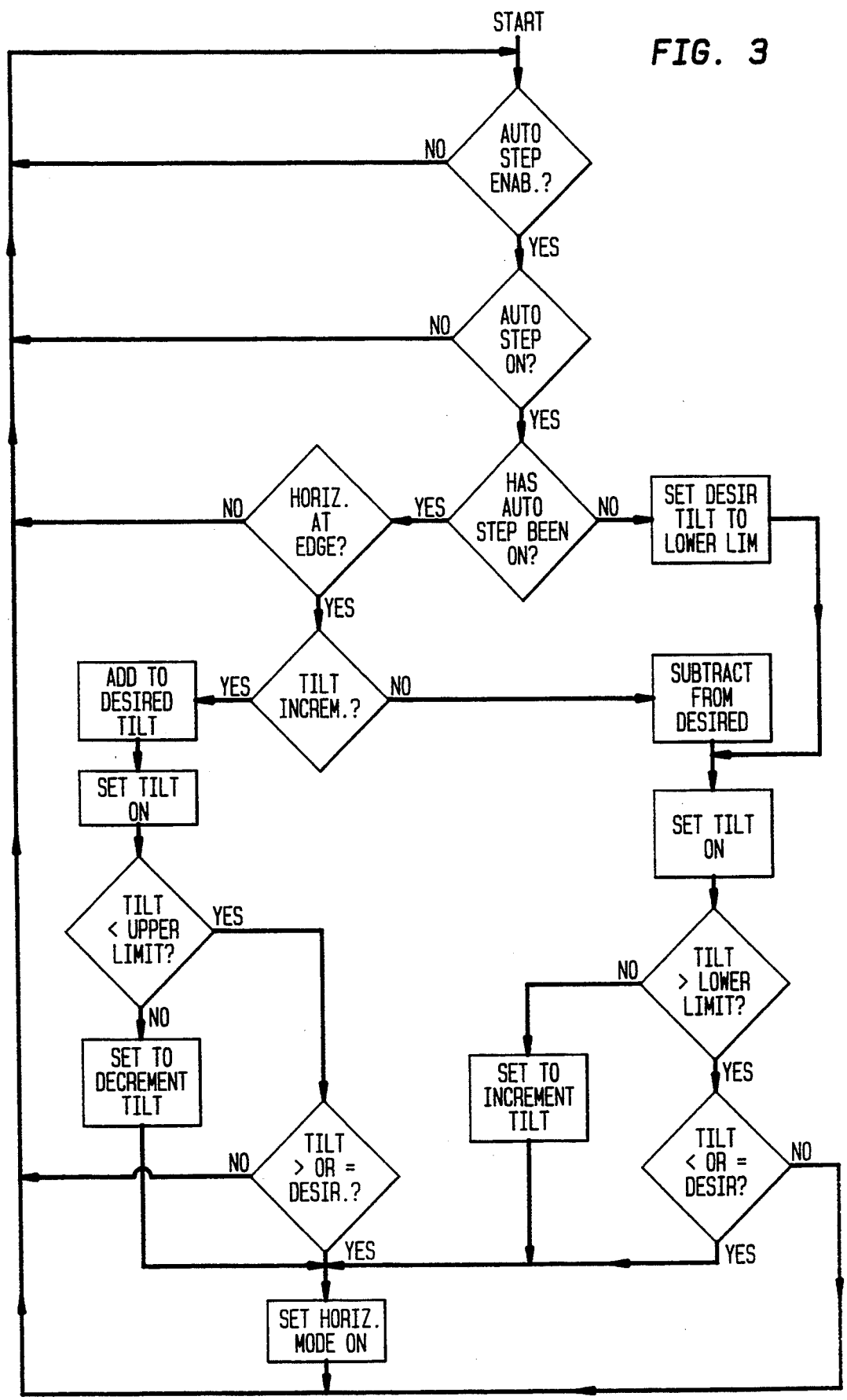
FIG. 3 is a flow chart for a microprocessor software routine for the step scan mode feature of the invention.
Figure 4B:
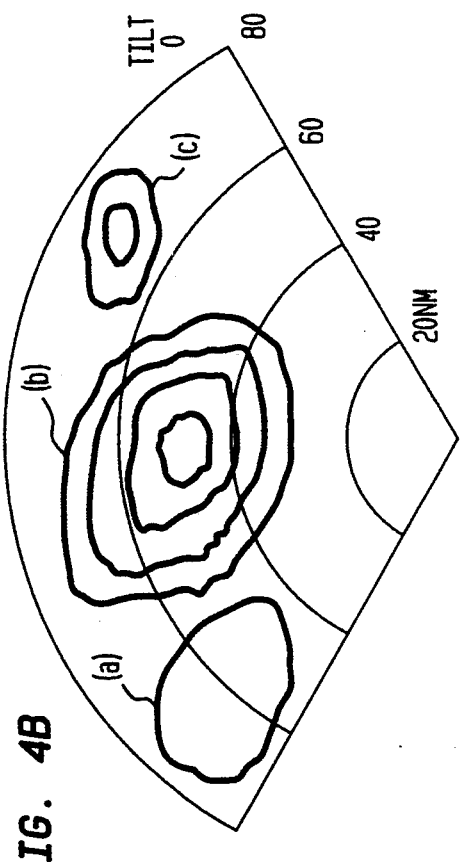
FIGS. 4A–4D are diagrammatic representations illustrating a typical display presentation available to a user in accordance with the invention.
Figure 4D:
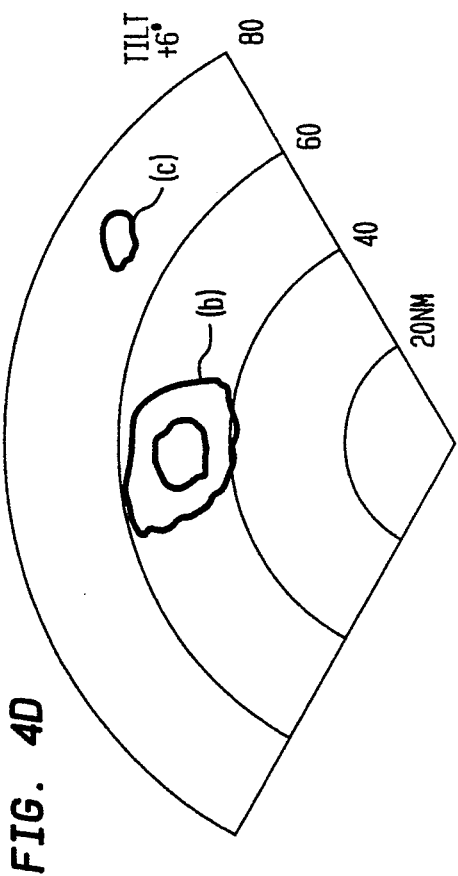
Figure 4C:
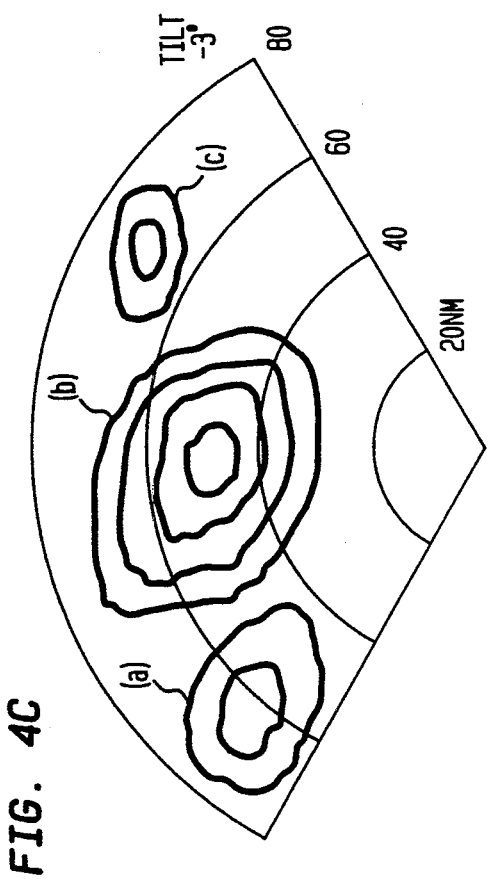
Figure 4A:
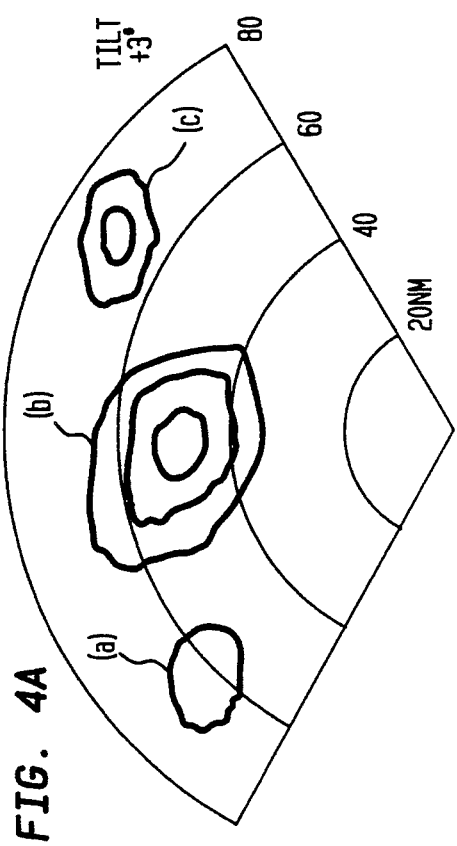

FIG. 3 illustrates the software implementation of the automatic step scan mode described above. Since microprocessor 8 controls the positioning of antenna 14, the software must create the desired operation of the microprocessor. Upon system power-up or start, the flow pattern begins. A check is made to see if the auto step scan is enabled (this is a configuration option) and also if it is turned on. If either is not the case, microprocessor 10 loops back to the start condition. If both are on, the tilt is set to, for example, the lower limit for the first time through the loop. Thereafter, the scan is checked for detection of an edge. If not yet at the edge, the flow loops back to the start. If at an edge, a check for tilt incrementing is made.

If incrementing, the incremental step is added to the desired tilt, and thereafter tilt drive 42 (FIG. 1) is turned on via microprocessor 8. Next the tilt angle is compared to the upper limit (FIG. 2). If less than the upper limit, a comparison to the desired tilt is made. If the tilt is greater than or equal to the desired tilt, the scan mode is switched to the horizontal mode and then looped back. If the tilt is equal to or greater than the upper limit, the mode is set to decrementing and then looped back.

If decrementing, the step is subtracted from the desired tilt, the tilt is turned on, and then compared to the lower limit. If greater than the lower limit, the tilt is compared to the desired tilt. If the tilt is less than or equal to the desired tilt, the horizontal mode is turned on and then looped back. If the tilt is greater than the desired tilt, then the flow is looped back to the start. If the tilt is less than or equal to the lower limit, the mode is set to increment the tilt and then looped back. The pattern may also be started from the upper limit for the first time through the loop, as will now be appreciated.

With reference to FIGS. 4A–4D, a typical display presentation sequence available to the user includes four plan views shown at tilt angles of +3, 0 −3 and +6 degrees, respectively. In actual use, the user may elect to have several other views as determined by the configurable end points and increment angle.

In FIGS. 4A–4D, three weather cells (a), (b) and (c) are displayed. As the user scans the sequential views, it is observed that the left cell (a) fades out as the tilt goes up. This is typical of a deteriorating weather cell which has low altitude rainfall but not much turbulence due to vertical wind currents. The center cell (b) is observed to maintain a lot of reflection at high altitudes, this is a good indication of a mature cell. The right cell (c) looks small at low altitudes (FIG. 4D) but maintains a reflection at higher altitudes. This is likely a building weather cell which could likely be the most dangerous of the three. An experienced user would avoid the middle and right cells.

This invention thus gives the user constantly up to date information for distance, azimuth angle, and tilt angle such that with good interpretation, safe conditions are assured.

It will be understood that although the invention has been described as step scanning in the elevation axis while continuously scanning in the azimuth axis for the purposes described, step scanning in the azimuth axis is within the spirit and scope of the invention as well.

It will be understood that the components of the invention illustrated and described with reference to FIG. 1 are well known to those skilled in the weather radar art and, accordingly, the invention resides not in the components themselves but in the arrangement thereof.

With the above description of the invention in mind, reference is made to the claims appended hereto for a definition of the scope of the invention.

What is claimed is:

1. A weather radar system operable in an automatic step scan mode, comprising:

means for storing weather data in memory;

means connected to the means for storing weather data in memory for displaying said weather data;

means associated with the means for displaying said weather data and operable by a user for selecting the step scan mode of operation of the weather radar system;

control means connected to an antenna included in the weather radar system for displacing said antenna;

means for storing radar system parameters;

the control means connected to the means associated with the means for displaying said weather data and to the means for storing radar system parameters, and responsive to the selected step scan mode of operation of the weather radar system for setting step scan mode parameters in the means for storing radar system parameters, said radar system parameter storing means applying the set step scan mode parameters to the control means; and the control means displacing the radar system antenna in accordance with the applied step scan mode parameters which include upper and lower scan angle limits and step scan angle increments, the radar system antenna being displaceable in an elevation axis and in an azimuth axis; and the control means displacing the radar system antenna to position the antenna beam in one axis of the elevation and azimuth axes between the upper and lower scan angle limits in the step scan angle increments while continuously scanning the other of the azimuth and elevation axes.

2. A system described by claim 1, wherein:

the control means displaces the antenna to position the antenna beam in the elevation axis between the upper and lower scan angle limits in the step scan angle increments while continuously scanning in the azimuth axis.

3. A system as described by claim 1, including:

means connected to the control means and to the means for storing weather data in memory and controlled by the control means for triggering said weather data storing means to store said weather data in memory.

4. A system as described by claim 1, including:

means connected to the control means and to the means for storing weather data in memory and controlled by the control means for applying the weather data stored in memory to the means for displaying the weather data.

5. A method for operating a weather radar system in an automatic step scan mode, comprising:

storing weather data in memory;

displaying the weather data stored in memory;

selecting the step scan mode in accordance with the displayed weather data;

storing step scan mode parameters;

setting the stored step scan mode parameters including setting upper and lower scan angle limits and step scan angle increments; and displacing the weather radar system antenna in accordance with the set step scan mode parameters for positioning the antenna beam, including displacing the antenna for positioning said antenna beam in one axis of an elevation and an azimuth axis between the upper and lower scan angle limits in the step scan angle increments while continuously scanning in the other of said axes.

6. A method as described by claim 5, including:

displacing the antenna for positioning the antenna beam in the elevation axis between the upper and lower scan angle limits in the step scan angle increments while continuously scanning in the azimuth axis.

7. A method as described by claim 5, wherein displacing the antenna to position the antenna beam in said one axis includes:

displacing a tilt control beyond a selected one of the upper and lower scan angle limits;

displacing the antenna to the one selected limit;

scanning in the azimuth axis in one direction;

displacing the antenna in the step scan angle increment;

scanning in the azimuth axis in an opposite direction;

displacing the antenna in the step scan angle increment; and continuing said displacing and scanning until the non-selected one of the upper and lower scan limits is reached.

* * * * *